Jan. 2, 1940.   B. D. HUBBELL   2,185,731
TRANSMISSION MECHANISM
Filed Feb. 12, 1936   2 Sheets-Sheet 2
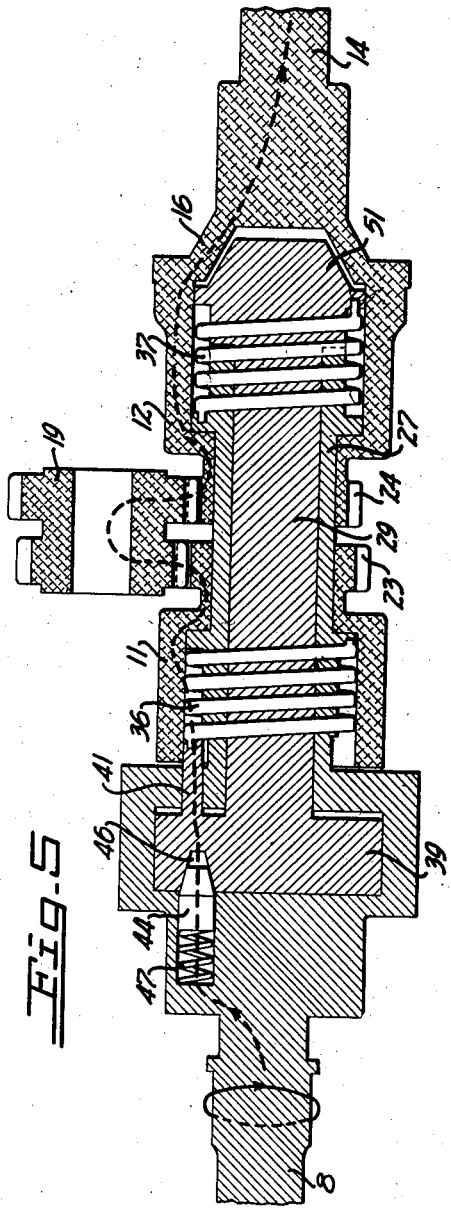
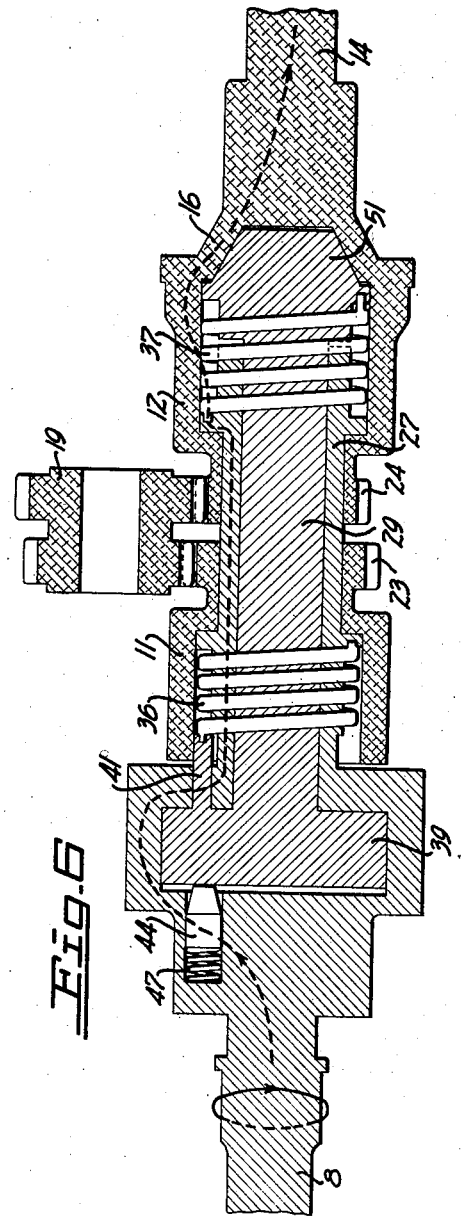
INVENTOR
BERT D. HUBBELL
BY
HIS ATTORNEY Patented Jan. 2, 1940

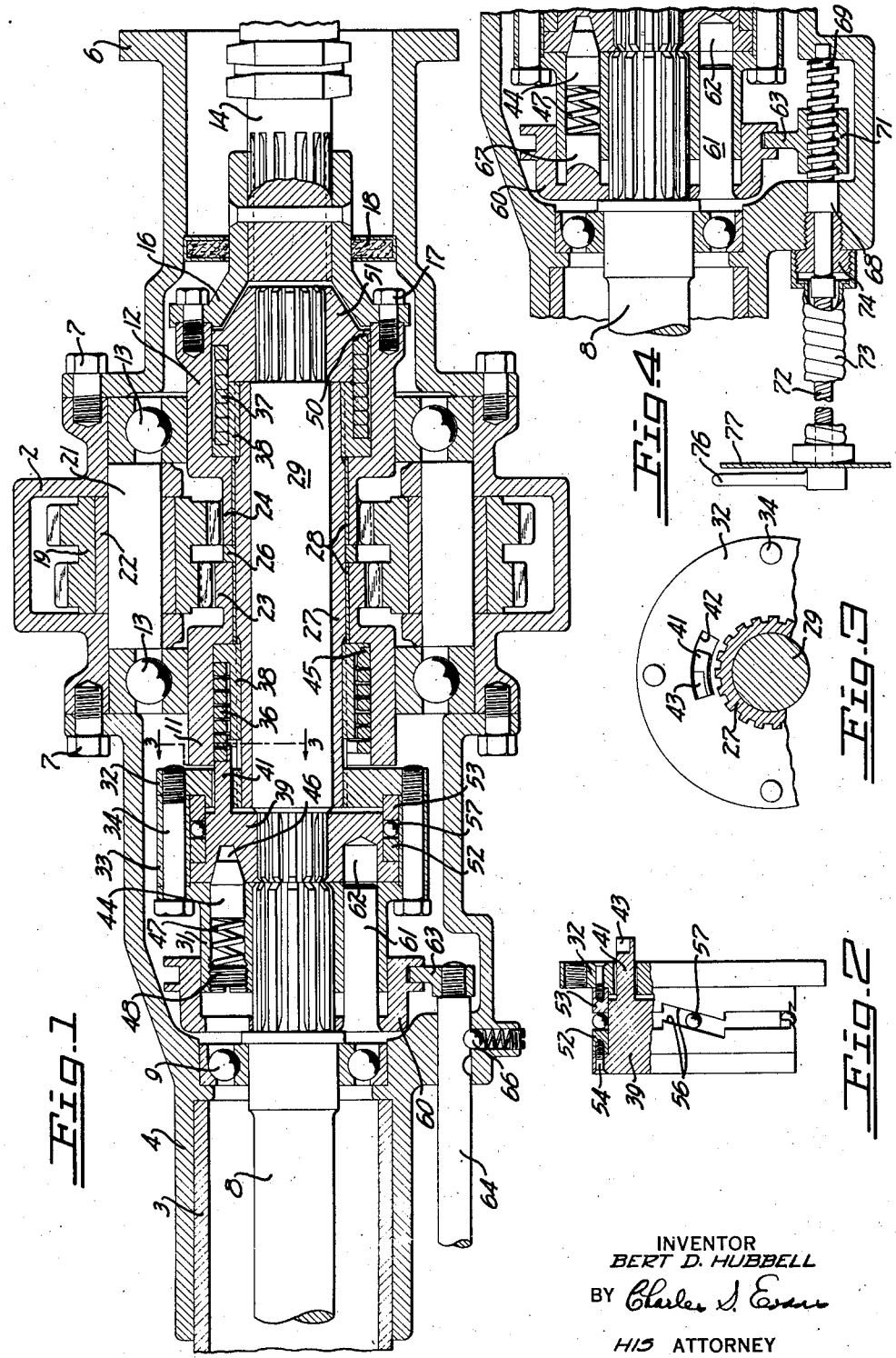

2,185,731

UNITED STATES PATENT OFFICE 2,185,731

TRANSMISSION MECHANISM

Bert D. Hubbell, Los Angeles, Calif., assignor to Spring Clutch Control, Inc., Bellingham, Wash., a corporation of Washington Application February 12, 1936, Serial No. 63,604

14 Claims. (Cl. 74—337)

My invention relates to transmission mechanism, and more particularly to speed change transmission for automobiles.

The broad object of my invention is to provide a transmission in which the shifting from one speed to another is accomplished automatically and in response to the torque conditions between the drive and driven shafts.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is an axial sectional view of an overdrive transmission embodying the improvements of my invention.

Figure 2 is a detail view, partly in section and partly in elevation, of the driving disk on the end of the intermediate shaft, and showing the clutch release cams.

Figure 3 is a vertical sectional view showing the milled slot in the end of the rotor casing, the plane of section being indicated by the line 3—3 of Figure 1.

Figure 4 is a fragmentary axial sectional view through the forward end of the transmission, and showing a modified form of construction.

Figure 5 is a diagrammatic axial sectional view of the working parts in overdrive; all fixedly connected parts are shown as one piece with like cross hatching to simplify the drawing, and the coils of the clutch springs are spread apart to aid in visualizing their operation, the path taken by the driving thrust being indicated by a heavy dashed and arrowed line; and Figure 6 is a similar view showing the mechanism with driving and driven shafts in direct connection, the driving thrust being similarly shown.

In terms of broad inclusion, the transmission mechanism embodying my invention comprises a pair of shafts, a speed change system, and means responsive to the torque conditions between the shafts for connecting them together through the system. The latter means preferably operates either to connect the shafts together for rotation as a unit, or to connect them through the speed change system, depending upon the character of differential rotation between the shafts. With an overdrive gearing, the transmission stays in high gear until the load on the driven shaft reaches a predetermined value at which time the transmission automatically shifts into direct drive. The latter condition obtains until the driven shaft tends to overrun the drive shaft, at which time the transmission automatically shifts back into high gear.

In greater detail, the transmission embodying my invention comprises a transversely split housing 2 adapted to be interposed in a torque tube 3 of an automobile. For this purpose, the forward end of the housing is provided with a neck 4 for receiving the end of the torque tube, and the rear end is provided with a flange 6 for bolting to the rear axle housing. The housing 2 of my transmission may conveniently be made up of three parts as shown, fastened together by suitable studs 7.

The propeller shaft 8 in the torque tube 3 projects into the forward end of housing 2, and forms the drive shaft of my transmission. This shaft is preferably journaled in the housing in a suitable bearing 9. The principal part of my mechanism is cased within a pair of clutch rings or cups 11 and 12, which are journaled in the central portions of the housing 2 in a pair of bearings 13, which comprise the main bearings of the unit.

The driven shaft 14 of the transmission is a stub shaft designed to connect with the driving pinion of the differential. This shaft 14 is connected directly with the rear cup 12 by a flanged coupling 16, splined and pinned to the shaft and bolted to the end of the cup by suitable studs 17. An oil retainer 18 is preferably interposed between the coupling 16 and the housing 2.

A speed change gear system is also provided in the housing, and is connected between the clutch rings 11 and 12. This system may comprise any suitable type of gearing. For purposes of illustration I have shown a simple gear system including a double gear 19, journaled on a jack shaft 21, on a suitable bearing 22. Shaft 21 is mounted in the side of the housing between the main bearings 13. Two of these double gears are shown, but any number may be provided. Since the transmission being described is an overdrive, the forward gear of each double gear unit is the smallest. If the forward gear is the largest the transmission is an underdrive or reduction gearing.

The gear system also includes a pair of gears 23 and 24 meshed with the double gear and connected with the clutch rings 11 and 12 respectively. These gears lie between the clutch rings and are preferably formed integrally therewith. A bearing ring 26 is preferably provided for spacing these gears. Gear 24 is a shaft fixed gear, since it is connected directly with the driven shaft 14 through the interposed clutch ring 12 and coupling 16; while the other gear 23 is a loose gear, it being fixedly connected with the free running clutch ring 11.

A sleeve 27 is journaled in the gears 23 and 24 in suitable bearings 28, and this sleeve in turn provides a journal for an intermediate shaft 29 lying between and coaxial with the drive and driven shafts. The length of the intermediate shaft is slightly less than the distance between the driving and driven shafts, so that a small amount of axial movement is permissible.

Sleeve 27 is connected directly with the drive shaft. The driving connection is made by a casing embracing the ends of the sleeve and shaft, and comprising end collars 31 and 32 splined on the shaft and sleeve respectively. These end collars are spaced by a cylindrical section 33, and the whole is fastened together by studs 34. By this connection the sleeve 27 always rotates with and is in fact a part of the drive shaft.

A pair of helical spring clutch elements 36 and 37 are provided, encircling the sleeve 27; one being interposed between the sleeve and clutch ring 11, and the other between the sleeve and clutch ring 12. These springs are both right hand wound, and are normally contracted and disengaged from the associated clutch rings, but are capable of being expanded into engagement with the outside rings. The inner ends of the springs are connected to the sleeve 27 by collars 38 splined to the sleeve and having end flanges provided with suitable recesses for receiving the ends of the springs.

The outer end of spring 36 is connected to a disk 39 fixed on the forward end of the intermediate shaft. This disk is enclosed by the casing 31—32—33, and connection between it and the spring is effected by an arm 41 projecting through an arcuate slot 42 provided in the end plate or collar 32. See Figure 3. Recess 43 in the end of the arm 41 is for receiving the end of the spring and to provide an abutment between the end of the spring and the arm, so that when the arm is rotated counterclockwise in the slot 42 as viewed in Figure 3, the clutch spring is expanded into engagement with the clutch ring 11.

The reason for spring 36 expanding is that one end is connected to sleeve 27 and the other end to disk 39, so that relative movement between these parts in one direction causes the spring to be unwound or expanded, while relative rotation of the parts in the opposite direction causes the spring to wind up or contract. The inner end of the spring is preferably positively connected to the collar 38 by an outturned lug 45, formed on the end of the spring and seated in a socket provided in the end flange on the collar.

Means are provided for holding the clutch spring 36 in its expanded condition to connect the shafts together through the overdrive gearing. For this purpose a conically pointed locking plug 44 is slidably mounted in the collar 31 and adapted to seat in a conical socket 46 provided in the disk 39. A spring 47 is compressed between a plug 48 threaded in the collar 31 and the slidable locking plug 44 for urging the latter into seated engagement with the socket 46. The positioning of this socket is such that the clutch spring 36 is expanded into engagement with the outer ring 11 before the plug 44 is fully seated in its socket 46, so that the final seating of the plug under the pressure of its spring 47 causes further rotation between the disk 39 and sleeve 27 to further tighten the clutch spring 36. A plurality of these spring pressed plugs are preferably provided.

When the locking plug 44 is engaged in its socket 46, the driving torque of the drive shaft 8 is transmitted directly to the intermediate shaft disk 39, and thence to the outer end of clutch spring 36 through arm 41. With a drive shaft rotating in a forward sense, as shown in Figure 5, and driving on the outer end of spring 36, the tendency of this spring is to still more tightly engage the ring 11. The driving thrust is thus transmitted to the loose gear 23 and hence to the driven shaft 14 through the double gear 19.

With this connection, as best illustrated in Figure 5, the transmission is in overdrive and the driven shaft 14 is rotating faster than the drive shaft.

This condition will obtain as long as the plug 44 remains seated in the socket 46. However, when the load on the driven shaft reaches a predetermined value, the plug 44 is forced out of engagement and the driving connection to the outer end of the overdrive clutch spring 36 is broken. As soon as the plug 44 is released, the relative rotation between the sleeve 27 and disk 39 will wind up the clutch spring 36 to its normally contracted condition out of engagement with the clutch ring 11, as shown in Figure 6. Under these conditions the overdrive gearing is disconnected. The particular load on the driven shaft required to drive back the locking plugs 44 depends upon the steepness of the tapered surfaces and the pressure of springs 47. This may be adjusted by turning the threaded plugs 48 to change the compression of the springs.

Means are provided for connecting the shafts together for rotation as a unit when the overdrive connection is severed. For this purpose a conically tapered end piece 51 is provided on the rear end of the axially movable intermediate shaft 29, which piece is adapted to shift into clutching engagement with the flared coupling 16 on the driven shaft. These parts are moved into engagement as soon as the plug 44 slips out of its socket; the pressure of the spring pressed plug on the end disk 39 operating to shift the intermediate shaft to the right, as shown in Figure 6.

The outer end of clutch spring 37 is positively connected by lug 50 to the end piece 51, so that when the intermediate shaft 29 is clutched to the driven shaft, the outer end of the spring is caused to rotate with the driven shaft. At this time the drive shaft and connected sleeve 27 are tending to overrun the driven shaft. This differential rotation between the shafts puts the driving thrust on the inner end of clutch spring 37 and causes it to unwind or expand into engagement with the clutch ring 12. The driving connection between collar 38 and the inner end of spring 37 is preferably the same as that between arm 41 and spring 36, that is, a recess providing an abutment for the end of the spring. Such an abutment directly on the end of the spring is better at the driving end than an outturned lug, since the latter might be sheared off. In the expanded condition of spring 37, as shown in Figure 6, the transmission is in direct drive.

The shift back into overdrive is also caused by a differential rotation between the shafts, but in this case by the driven shaft overrunning the drive shaft. When this takes place, the intermediate shaft 29 is rotated faster than the driving sleeve 27 and the direct drive clutch spring 37 is wound up and disengaged from the ring 12.

At the same time, the overdrive clutch spring 36 is unwound and expanded into engagement with its ring 11. Also the intermediate shaft disk 39 is rotated to allow the locking plug 44 to drop back into the socket 46. The driving thrust is now again on the outer end of spring 36, and driving connection is through the overdrive gearing. This will be maintained until such time as the load on the driven shaft again forces the plug 44 out of its socket.

Means are also preferably provided for insuring a positive disengagement of the clutch head 51 from the element 16 when the transmission is in overdrive. This may be accomplished, as best shown in Figure 2, by providing a pair of cam rings 52 and 53 on the intermediate shaft cam rings 52 and 53 on the intermediate shaft disk 39 and end collar 32. These rings are seated in an annular groove provided in the disk 39, and are also enclosed by the casing which surrounds the disk. Suitable screws 54 serve to fasten the cam rings to their respective parts.

The adjacent inner edges of the rings 52 and 53 are provided with parallel cam surfaces 56 inclined to the axis of the shafts, and suitable rollers or balls 57 are interposed between these surfaces. By this arrangement the intermediate shaft 29 is shifted to the left, as viewed in Figure 1, when it overruns the drive shaft. This positively disengages the clutch head 51.

Of course the relative turning movement between the drive and intermediate shafts is very small. The differential rotation is just enough to allow disengagement of plug 44 from its socket, so that a fractional relative rotation will cause the plug to drop in again. This allows the engaged clutch head 51 to be turned enough to permit reengagement of the plug 44 in the disk 39 before the head is pulled out of clutching engagement with the driven shaft. As soon as the tapered plug enters its socket, the intermediate shaft and connected parts are further rotated by the action of the plug in seating itself under the pressure of spring 47.

As an example of the operation of my transmission, consider that an automobile equipped with the transmission travels over a hill, where the car is first subjected to an up-hill grade and then to a down-hill grade. Assuming that the transmission is in overdrive when the car starts up the hill, as shown in Figure 5, the effect of the up grade will be to increase the load on the driven shaft until the torque between the shafts becomes so great that the plugs 44 will no longer hold their seats in sockets 46. When the locking plugs slip out, the driving connection to the outer end of overdrive spring 36 is broken and the latter immediately wraps itself up to its normally smaller diameter, as shown in Figure 6. This disconnects the drive shaft from the overdrive gearing.

At the same time the intermediate shaft 29 is shifted to the right and clutched to the driven shaft through the clutch head 51. This causes the intermediate shaft to turn with the driven shaft, which is moving in the very small arc within which relative movement is possible, more slowly than the free running drive shaft 8 and the fixedly connected sleeve 27. As a result, the inner end of the direct drive clutch spring 37 is rotated faster than its outer end, causing it to expand into driving engagement with the clutch ring 12. The drive shaft is therefore connected directly with the driven shaft, and the drive shaft picks up the load in direct drive. See Figure 6.

This condition will then be maintained until the car is on the down grade. At this time the torque conditions between the shafts are reversed, since the momentum of the car tends to cause the driven shaft to overrun the drive shaft. At this time the intermediate shaft is clutched to the driven shaft through the head 51, so that it also tends to overrun the driving sleeve 27. This differential rotation between the parts wraps up the direct drive clutch spring 37 and therefore disconnects the direct connection between the shafts.

The same differential rotation turns the intermediate shaft disk to expand the overdrive clutch spring 36 and permit reengagement of the locking plugs 44. Consequently the shafts are again connected through the overdrive gearing. This connection will then be maintained until torque conditions force back the locking plugs and permit the drive shaft to again overrun the driven shaft, at which time the transmission will automatically drop back into direct drive. See Figure 5.

When the car is in reverse the drive through my transmission is through the overdrive gearing. With the drive shaft rotating backwards, the driving thrust is applied to the inner end of clutch spring 36, causing this spring to further tighten against its ring 11 and transmit the driving torque through the gearing.

Another feature of the invention, shown in Figure 1, is the provision of manually operable means for positively locking the drive shaft to the intermediate shaft to lock the transmission in overdrive. This comprises a shiftable cup 60 having a pin 61 slidable thru the collar 31 and engageable in a socket 62 in the disk 39. The cup is shifted by a yoke 63 on a rod 64 slidably mounted in the housing. The connecting rod may be actuated by a suitable lever in the driver's compartment, and is held in its operative positions by a spring pressed ball 66. When the pin is retracted, as shown in Figure 1, the releasable plug 44 may function to allow the transmission to drop into direct drive, but when the pin 61 is extended into socket 62, the transmission is positively locked in overdrive.

In the variant form of construction shown in Figure 4, means are provided for adjusting the compression of the plug spring 47 to change the torque required to drive back the plugs 44, thereby altering the point at which the transmission shifts from overdrive to direct. For this purpose a second pin 67 is provided on the shiftable cup 60 slidably engaging the plug hole behind the spring 47. In this case the locking pin 61 is short enough to allow a degree of spring adjustment before the pin enters the socket 62.

The means for moving the cup 60 in this case preferably comprises a shaft 68 journaled in the housing and having a portion threaded to provide a screw 69. This screw has a nut 71 carrying the yoke 63, which operates to shift the cup 60 when the shaft 68 is rotated. The pitch of the thread is flat enough to lock the cup in a selected position of adjustment. A flexible shaft 72 is connected with the shaft 68, and is enclosed in a flexible tubing 73 secured to a boss 74 threaded in the housing. The other end of this flexible shaft connects with a control lever 76 mounted on the instrument panel 77 of the driver's compartment. By manipulating this control, the driver may alter the tension of the springs 47 and thus vary the conditions which cause the transmission to automatically shift from overdrive to direct.

I claim:

1. A transmission comprising a drive shaft, a driven shaft, an intermediate shaft, a gearing, a clutch ring connected to said gearing, a second clutch ring connected to the gearing and to the driven shaft, helical spring clutch elements engageable with said rings and each connected at one end to the intermediate shaft and at the other end to the drive shaft, means for yieldably locking the intermediate shaft to the driving shaft, and means for clutching the intermediate shaft to the driven shaft.

2. A transmission comprising a drive shaft, a driven shaft, an axially movable intermediate shaft, a gearing, a clutch ring connected to said gearing, a second clutch ring connected to the gearing and to the driven shaft, helical spring clutch elements engageable with said rings and each connected at one end to the intermediate shaft and at the other end to the drive shaft, means for yieldably locking the intermediate shaft to the driving shaft, and means operable upon axial movement of the intermediate shaft for clutching the latter to the driven shaft.

3. A transmission comprising a drive shaft, a driven shaft, an axially movable intermediate shaft, a gearing, a clutch ring connected to said gearing, a second clutch ring connected to the gearing and to the driven shaft, helical spring clutch elements engageable with said rings and each connected at one end to the intermediate shaft and at the other end to the drive shaft, spring pressed means for yieldably locking the intermediate shaft to the drive shaft and for applying pressure to one end of the intermediate shaft, a clutch engageable upon axial movement of the intermediate shaft for clutching the latter to the driven shaft, and a cam for holding the latter clutch disengaged when the intermediate shaft is locked to the drive shaft.

4. A transmission comprising a drive shaft, a driven shaft, an intermediate shaft, a gearing, a sleeve encircling the intermediate shaft and mounted for rotation with the drive shaft, a clutch ring encircling the sleeve and connected to said gearing, a helical spring clutch element interposed between said ring and sleeve and connected at one end to the sleeve and at the other end to the intermediate shaft, a second clutch ring encircling the sleeve and connected between the gearing and driven shaft, a helical spring clutch element interposed between the second ring and said sleeve and connected at one end to the sleeve and at the other end to the intermediate shaft, means for yieldably locking the intermediate shaft to the driving shaft and means for clutching the intermediate shaft to the driven shaft.

5. A transmission comprising a drive shaft, a driven shaft, an intermediate shaft, a double gear, a pair of gears meshed with the double gear, a clutch ring connected with one of the gears of said pair, a second clutch ring connected between the other gear and the driven shaft, helical spring clutch elements associated with said rings and each connected at one end to the intermediate shaft and at the other end to the drive shaft, means for yieldably locking the intermediate shaft to the driving shaft, and means for clutching the intermediate shaft to the driven shaft.

6. A transmission comprising a drive shaft, a driven shaft, a gearing, a helical spring clutch for connecting the shafts together thru the gearing, a second helical spring clutch for connecting the drive shaft with the driven shaft, said clutch springs having one end connected to one of the shafts, and means connected with the other ends of the clutch springs and engageable with the other shaft for engaging the clutches upon relative rotation between the shafts, said clutch springs being wound so that one of the clutches is engaged when the drive shaft overruns the driven shaft and the other clutch is engaged when the driven shaft overruns the drive shaft.

7. A transmission comprising drive and driven shafts, a clutch ring connected with the driven shaft, a gearing connected to the clutch ring, a second clutch ring connected to said gearing, helical spring clutches drivably connected with the drive shaft and frictionally engageable with said clutch rings, means for holding one of the spring clutches in engagement with a clutch ring until the load on the driven shaft reaches a predetermined value, and means for engaging the other spring clutch with the other clutch ring after the first spring clutch is released.

8. A transmission comprising a drive shaft, a driven shaft, a gearing drivably connected with the driven shaft, a clutch ring connected with the gearing, a second clutch ring connected with the driven shaft, a pair of helical clutch springs connected at one end with the drive shaft and engageable with said clutch rings, and clutch actuating means connected with the other ends of the springs and engageable with the driven shaft, said clutch springs being wound so that one of the clutches is engaged when the drive shaft overruns the driven shaft and the other clutch is engaged when the driven shaft overruns the drive shaft.

9. A transmission comprising a drive shaft, a driven shaft, a gearing drivably connected with the driven shaft, a clutch ring connected with the gearing, a second clutch ring connected with the driven shaft, a pair of helical clutch springs connected at one end with the drive shaft and engageable with said clutch rings, and clutch actuating means rotatable relative to the drive shaft and connected with the other ends of the springs for turning the latter, said springs being wound so that one of the clutches is engaged when said means rotates in one direction relative to the drive shaft and the other clutch is engaged when the means rotates in the other direction relative to the drive shaft.

10. A transmission comprising drive and driven shafts, a gearing, a helical spring clutch for drivably connecting the shafts together, a second helical spring clutch for drivably connecting the shafts together through the gearing, and means operable upon relative rotation between the shafts for winding and unwinding the spring clutches, said springs being wound so that one of the clutches is operatively engaged when the drive shaft overruns the driven shaft and the outer clutch is operatively engaged when the driven shaft overruns the drive shaft.

11. A transmission comprising drive and driven shafts, a gearing, a helical spring clutch for drivably connecting the shafts together, a second helical spring clutch for drivably connecting the shafts together through the gearing, means operable upon relative rotation between the shafts for winding and unwinding the spring clutches, said springs being wound so that one of the clutches is operatively engaged when the drive shaft overruns the driven shaft and the other clutch is operatively engaged when the driven shaft overruns the drive shaft, and means responsive to torque conditions between the shafts for releasing one of the clutches.

12. A transmission comprising drive and driven shafts, a gearing drivably connected with the driven shaft, a clutch ring connected with the driven shaft, a second clutch ring connected with the gearing, helical spring clutches each connected at one end with the drive shaft and engageable with said clutch rings upon turning the other ends of the springs, and means for turning said other ends of the springs to engage one of the springs with its clutch ring and simultaneously disengage the other spring from its clutch ring.

13. A transmission comprising drive and driven shafts, a gearing drivably connected with the driven shaft, a clutch ring connected with the driven shaft, a second clutch ring connected with the gearing, helical spring clutches each connected at one end with the drive shaft and engageable with said clutch rings upon turning the other ends of the springs, and means actuated by relative rotation between the shafts for turning said other ends of the springs to engage one of the springs with its clutch ring and simultaneously disengage the other spring from its clutch ring.

14. A transmission comprising a drive shaft, a driven shaft, a gearing drivably connected with the driven shaft, a clutch ring connected with the driven shaft, a second clutch ring connected with the gearing, a pair of helical clutch springs each connected at one end with the drive shaft and engageable with said clutch rings, clutch actuating means connected with the other ends of the springs and engageable with the driven shaft, said clutch springs being wound so that one of the clutches is engaged when the drive shaft overruns the driven shaft and the other clutch is engaged when the driven shaft overruns the drive shaft, and means for holding one of said clutch springs in engagement with its clutch ring until the load on one of the shafts reaches a predetermined value.

BERT D. HUBBELL.